March 18, 1958     P. GRAHAM     2,827,305
CURVED SAFETY BARRIER FOR VEHICLES
Filed Sept. 6, 1955     4 Sheets-Sheet 1
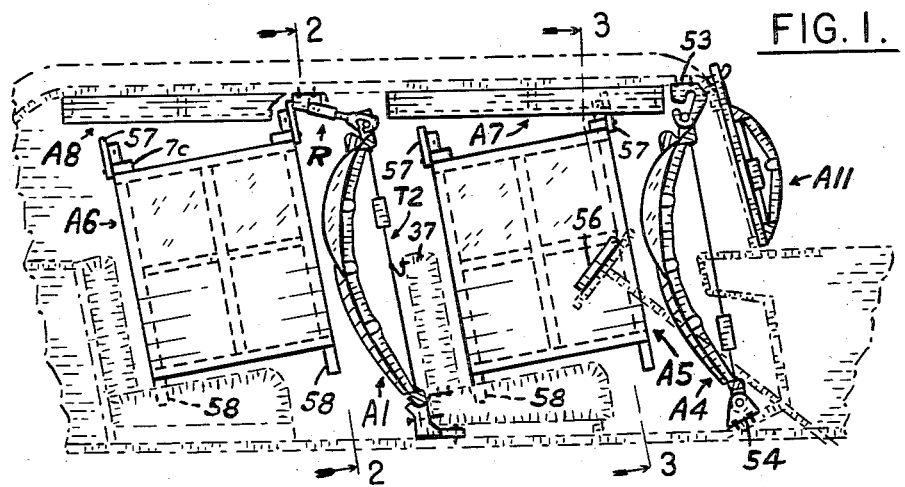
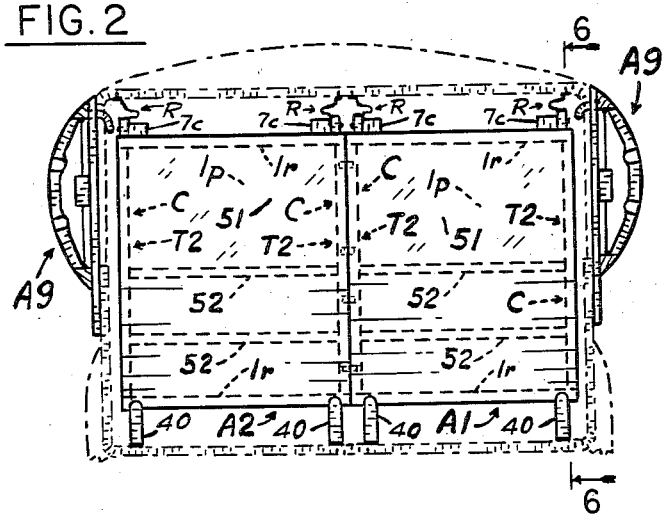
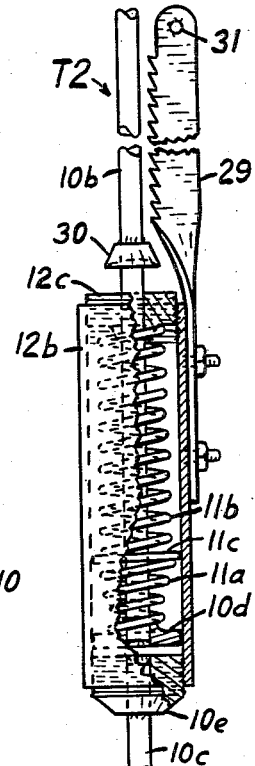
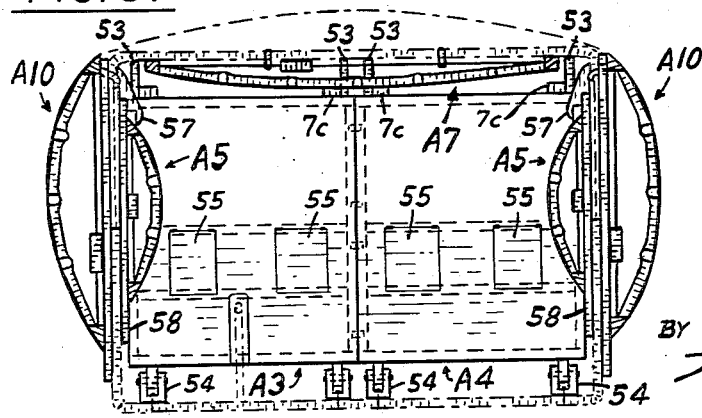
INVENTOR.
Phillip Graham
BY
ATTORNEY

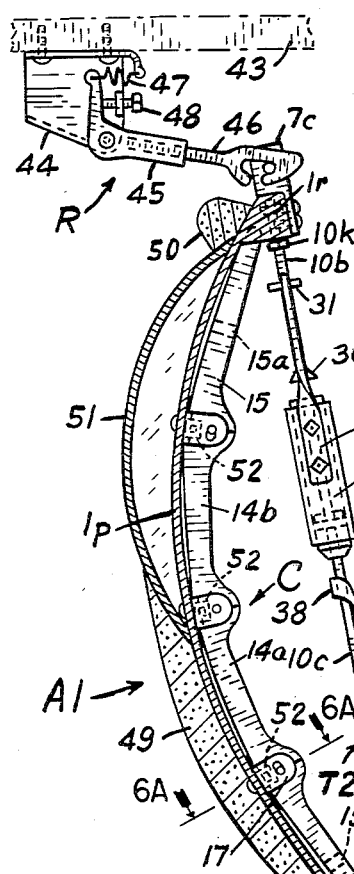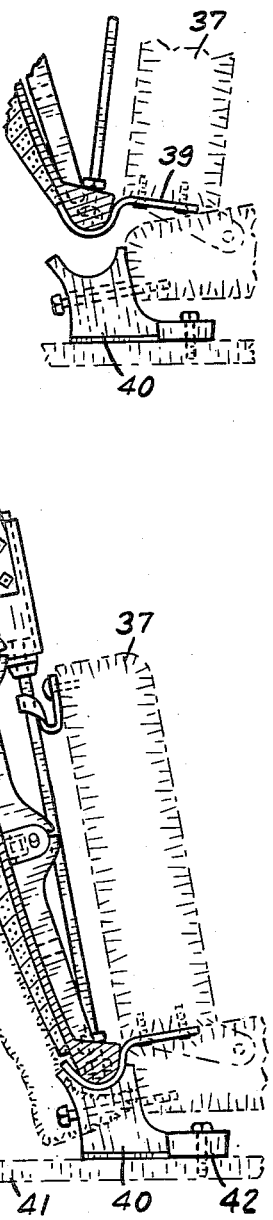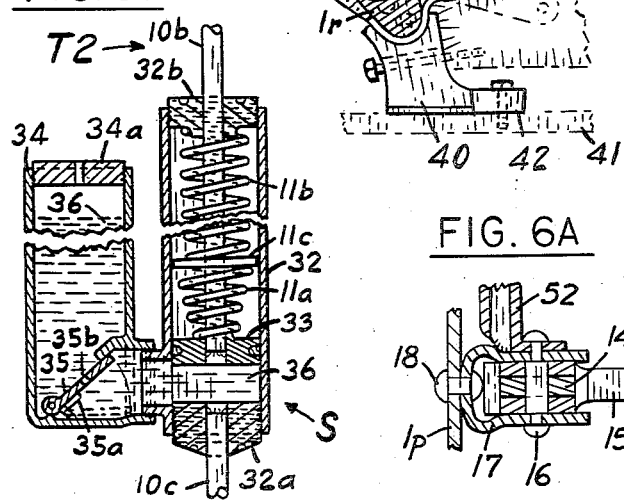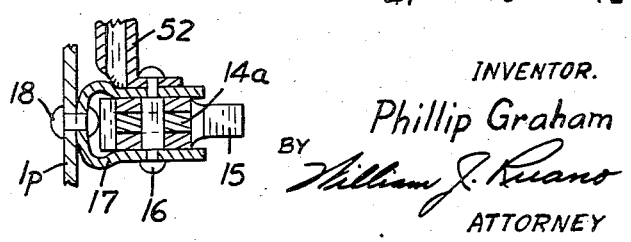
March 18, 1958 — P. GRAHAM — 2,827,305
CURVED SAFETY BARRIER FOR VEHICLES
Filed Sept. 6, 1955 — 4 Sheets-Sheet 2
FIG. 6. FIG. 7. FIG. 8. FIG. 5. FIG. 6A.
INVENTOR.
Phillip Graham
BY William J. Ruano
ATTORNEY March 18, 1958 P. GRAHAM 2,827,305
CURVED SAFETY BARRIER FOR VEHICLES
Filed Sept. 6, 1955 4 Sheets-Sheet 3

INVENTOR.
Phillip Graham
BY
ATTORNEY

March 18, 1958  P. GRAHAM  2,827,305
CURVED SAFETY BARRIER FOR VEHICLES
Filed Sept. 6, 1955  4 Sheets-Sheet 4

INVENTOR.
Phillip Graham
BY
ATTORNEY

United States Patent Office
2,827,305
Patented Mar. 18, 1958

2,827,305

CURVED SAFETY BARRIER FOR VEHICLES

Phillip Graham, Pittsburgh, Pa.

Application September 6, 1955, Serial No. 532,440

12 Claims. (Cl. 280—150)

This invention relates to a barrier in the form of a cushioning safety closure or shield, which may be positioned in front of a vehicle occupant. The barrier is curved like a bow, yieldable to change its degree of bowed curvature when subjected to loads, light in weight, strong, and which may be transparent.

This invention is a continuation-in-part of my co-pending applications, Serial No. 363,867, filed June 24, 1953, entitled Curved Closure Device; and Serial No. 449,695, filed August 13, 1954, entitled Curved Barrier.

A barrier embodying the principles of this invention has a small amount of material which is shaped for optimum use to provide a safety barrier that can offer security against possible fatal injury and property damage. In general, the parts are confined and forced to work efficiently. Automobiles and other types of conveyances may be equipped with safety barriers to provide transparent safety cushioning or restraining means which will yieldingly resist and absorb the impact forces of occupants thrown against them, due to momentum, when there is a sudden stoppage such as that during a collision. The barriers will restrain the occupants from being hurled forwardly against rigid framing. These barriers may have means such as catches or snubbers to prevent people, or objects, from being violently bounced backwards after the forward momentum has been absorbed.

An object of my invention is to provide a low-cost, light-weight, compact, strong, and durable barrier, to yieldingly resist and cushion violent impacts and to restrain these forces, and which will not permanently deform as the result of the violent forces, except extremely violent forces. The barrier will expendably deform permanently under extremely violent forces to provide additional protection. The barrier may be partially transparent to allow viewing through it.

Other objects of my invention will become more apparent from the following description, taken with the accompanying drawings wherein:

Figure 1 is a fragmentary, sectional elevation taken through an automobile showing uses of the barriers;

Figure 2 is a fragmentary, sectional elevation taken along line 2—2 of Figure 1;

Figure 3 is a fragmentary, sectional elevation taken along line 3—3 of Figure 1;

Figure 4 is an enlarged detail showing a yieldable restraining link and catch for the tie rods in the barrier;

Figure 5 is an enlarged detail showing a modified yieldable restraining link and snubber for the tie rods in the barrier;

Figure 6 is an enlarged fragmentary sectional elevation taken along line 6—6 of Figure 2;

Figure 6A is an enlarged, fragmentary, sectional view taken along line 6a—6a of Figure 6;

Figure 7 is a view similar to Figure 6, showing the barrier acting to cushion an occupant who is thrown against it during a collision;

Figure 8 is a fragmentary view, similar to the lower portion of Figure 6, showing the barrier tilted with a tiltable automobile seat;

Figure 20:
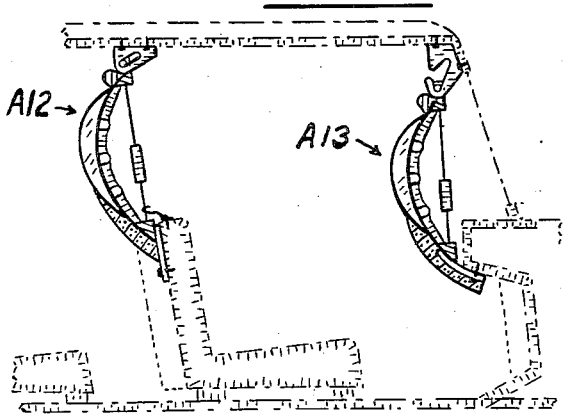

Figures 14 to 19 inclusive are reduced fragmentary sectional elevational views similar to Figure 6, showing barrier modifications;

Figure 20 is a sectional elevation similar to Figure 1, showing smaller barriers in an auto.

Figures 1 to 8 inclusive show how thin curved paneled barriers or closure-shields A1 to A11 inclusive may be attached to automobiles, other conveyances, and the like, to act during accidents to effectively cushion violent forces to prevent injury, maiming, and death to the people in the accidents and to prevent property damage. These barriers act similar to the barriers described in my co-pending application Serial No. 449,695. The principal difference between the two inventions is the inclusion, in the later invention, of means to prevent objectionable rebounding of the barriers. The barriers inside an auto provide cushioning and restraining means which slow down and check the momentum of the occupants of an auto when a quick deceleration is made, such as the stoppage during a collision. During a quick deceleration, the momentum tends to hurl the occupants forwardly until they strike the rigid car framing, including the windshield. The safety barriers prevent or lessen injury, since they catch the occupants being carried by the momentum, ease their movement to a stop, then holding means prevent the barriers from rebounding and hurling the people backwards. The inside barriers also cushion and stop the flight movement of objects such as luggage that is being transported on the rear seat. The barriers A9, A10, A11, and the like, may be used on the outside of automobiles to act during a collision to contact, cushion, and then to tend to rebound to force the colliding objects away from each other. Thus the barriers A9, A10, and the like, act when struck by another auto to tend to bounce the colliding autos apart. Colliding autos often snag to each other. The auto with the greatest momentum force drags the other. When such action occurs, the autos are usually thrown out of control and they veer and obstruct a large portion of the highway, thus they are often struck by other vehicles. The barrier A9 or A10 may act when an auto is striking a pedestrian. A barrier that contacts the pedestrian would tend to cushion the impact and then to bounce the pedestrian away from the vehicle rather than to snag his body and drag him.

The barrier A11 may be hung in front of a common windshield or it may be used without a common windshield. It cushions and deflects missle-like objects that are torn loose from a car it collides with; also missles thrown by vandals, rioters, and the like, including grenades by opposing forces during warfare. The barriers A9, A10, and A11 also cushion the force of explosions such as those in warfare.

The barriers A1 to A6 inclusive provide much needed protection to auto occupants, since they are transparent cushions with great cushioning means that would not have objectionable rebounding actions. They may be strong, efficient for the material used in their construction, light in weight, low in cost, and they take up little space. The violent forward force of the occupants against the barriers during a collision are diverted into the arch direction of the bowed barrier panel and then the forces are yieldingly or cushionably resisted by resilient ties, with only a small fraction of the force being transmitted into the auto structure framework. The barriers may be made pleasingly attractive, since they may be made of clear plastic which is attractive in itself, and the transparency allows the matter behind the barrier to be visible. Thus the barriers may be used without objectionably obscuring portions of the auto or the occupants. Pleasingly attractive padding may also be part of the barrier.

It has been proven that auto occupants can be cushioned to enable them to withstand the quick deceleration caused by a violent collision. Stunt drivers have intentionally crashed autos at high speed without being injured. They acted to protect themselves just before the collision by facing to the rear with their backs to a mattress-like cushion that had been placed behind the front seats. Safety belts and crash helmets are used by auto racers and a small group of the general public for a degree of protection. Safety belts furnish less protection than the barriers. The public shows little enthusiasm for the future general use of safety belts and less enthusiasm for their wearing of crash helmets. Since safety belts are confining and have to be coupled and uncoupled, it is doubtful that the general public would take the time to fasten safety belts if cars were equipped with belts. The barriers in an auto would be in position to maintain protection, whether or not the people were lax or indifferent about safety precautions. The barriers would be maintained in fixed positions or be self-coupled by necessary movements such as that of tilting of the front seats back to their normal upright positions. Safety belts may be used along with the barriers. The barriers particularly furnish needed protection for small children who often stand on auto seats to see the scenery. Small children need the protection of the barriers when they are taking a nap while lying on an auto seat. They also need protection against the effects of rapid deceleration while they are sitting on an auto seat, since they are unable to brace themselves because their legs do not reach the auto floor to allow a bracing action. The barrier arrangements shown allow means to adapt the barriers to existing autos. Modified arrangements (not shown) such as barriers in combination with higher ceilings in automobiles and less projecting dashboards, may be incorporated into new designs for autos to make more effective use of safety barriers.

The barriers A1 and A2 are alike in general. They have curved shells or panels 1p which are bowed in height, chain ribs C and ties T2. The upper portion of the panel 1p is transparent, thus visibility in maintained. When the occupant's body is thrown forward by momentum during a collision, the barrier panel 1p is flattened to an extent since the springs in the tie T2 yield and absorb the thrust. A holding means such as a catch or a snubber may be incorporated into the barrier to prevent violent rebounding of the occupants. Barriers without a catch would tend to hurl or bounce the occupants back towards their seats. The rebound would not be as objectionable as being thrown forward into the windshield and dashboard. The barriers without a catch or snubber furnish considerable protection during very violent crashes since the ties would likely break after absorbing most of the thrust against them. Thus such breakage would eliminate the rebounding action. Less violent crashes would cause barriers without catches to yield momentarily then resist without yielding, thus the rebound force would not be as great in such violent crashes as the forward forces. Thus the barrier would be useful to a limited degree without the rebound retarder. Since auto accidents are becoming more violent because of the increasing speeds used today, the barriers would furnish much more protection when they have a holding or retarding means. A catch is incorporated into the arrangement shown in Figure 4 and a snubber or retarder is incorporated into the arrangement shown in Figure 5. Either the catch or the snubber may be used. The catch would be lower in cost. The snubber would be fully automatic in allowing the barrier to be reset after a collision.

During a collision, the ties T2 absorb most of the force from the arched thrust that is diverted into the top and bottom edges 1r. A tie T2, as shown in Figure 4, has stiff heavy rods 10b and 10c. An anchor disk 10d is attached to the lower end of the rod 10b. A threaded disk 10e is fastened, such as by welding, to the top of the rod 10c. The disk 10e is threaded into the lower portion of the limit tube 12b. A light spring 11a and heavy spring 11b are enclosed by the tube 12b. The adjustable tube end 12c is in threaded engagement with the tube 12b. The washer 11c separates springs 11a and 11b. During a collision, the weaker spring 11a readily yields to allow partial flattening and yielding of the bowed panel 1p to cushion slight impacts or cushion and slow up the initial forces of violent impacts before the heavy spring 11b increases the resistance against the thrust from the shell 1p. Springs 11b and 11a may be combined if preferred. The jet T2 is greatly stressed to resist the violent forces after the springs 11a and 11b have reached their depressed limit and terminated the cushioning action. Excessive yielding would cause the shell 1p to flatten and then to buckle and collapse. The spring steel catch bar 29 is fastened to the tube 12b. The conical ring 30 is fastened to the rod 10b. When the tie T2 yields from a collision force, a tooth of the catch 29 engages the ring 30 and holds it at nearly the position of the limit of the yielding action to prevent the springs 11a and 11b from rebounding. This holding action prevents the barrier panel and thus the occupant bearing against it from being violently rebounded. As shown in Fig. 6, the nuts 10k restrain the ends of a flexible panel 1p from pulling away from the ends of the tie rods and rebounding while the tie T2 holds. After a collision, the catch handle 31 is pulled, laterally, away from the tie T2 to release the ring 30 to allow the rebounding action to take place. All the catch handles 31 on a barrier may be rigged together (not shown) with a cable and pulleys to allow them to be released simultaneously. The catch shown in Figure 4 is cheap to make and is sufficient to safeguard the occupants during most collisions.

The retarder or snubber S shown with the tie in Figure 5 would automatically allow a barrier that has been partially flattened by a body impact to reset to its normal non-deflected bowed shape with a slow rebounding action that would not tend to cause injury to the auto occupants. A snubber would especially provide needed protection to children, elderly people, and frail people who frequently need such cushioning means, as the barriers, to prevent them from being thrown forward against rigid framing during violent braking deceleration actions. Stronger persons can brace themselves to resist being thrown forward from such decelerations. A catch such as that shown in Figure 4 would have to be reset manually. It would be likely that human fallacy would cause postponement of releasing the catches after minor impacts have deflected the barrier during sudden braking decelerations. Thus the barrier may not be set to obtain the maximum cushioning effect when another emergency stop occured.

Details of a snubber S are shown in Figure 5. The snubber S has a cylinder 32. The cylinder has an end closure 32a at the bottom and an adjustable end closure 32b at the top. These closures are similar to disk 10e and end 12c that are shown in Figure 4. A piston head 33 is attached to the bottom of the rod 10b; the rod 10b acting as a piston rod. The cylinder 32 has an offset with an opening to which is attached a hydraulic fluid reservoir 34. A self-closing valve 35 is positioned in a passage-way in the reservoir 34. There is a bleeder hole 35b in the center of the valve 35. A spring 35a keeps the valve closed except when a vacuum force is created that opens it. There is a small air hole in the reservoir cap 34a. The snubber S is filled with hydraulic fluid 36. When the barrier is flattened to a degree under an impact, the ties T2 are tensioned. The rod 10b with its head 33 yields as the springs 11a and 11b yield. This action increases the space between the head 33 and the end 32a, causing a partial vacuum. The air pressure on the hydraulic fluid 36 in the reservoir 34 forces the valve 35 to open, allowing the fluid 36 to enter the vacuumed space in the cylinder 32. When the barrier has absorbed a force and the springs start it to rebound, the head 33 is forced against the fluid 36 causing the fluid to be highly pressurized. This pressure along with the spring 35a closes the valve 35, thus trapping some of fluid 36. Since the fluid cannot be compressed, the head 33 and thus the tie T2 are blocked, which prevents the quick rebounding of the barrier. The highly pressurized fluid 36 would then slowly bleed through the small hole 35b, thus allowing the barrier to slowly rebound to its normal shape.

The contours of the cut-backs on the rib links 14a, 14b and 15 may be of a curvature that would bear fully against the shell 1p when the maximum desirable flattening of the shell under a load takes place, to maintain an arched shape in the shell. As shown in Fig. 6a, a clevis 17 may have a bowed resilient diaphragm that provides a gap between the rivet 18 and the links 14a and 15 to allow slight outward and inward movement of the shell 1p. The clevis 17 has a pin 16.

A link 15 may be made slightly resilient by having a hole or eye 15a in it, as shown in Fig. 6, to allow it to bend slightly to maintain bearing contact with the socket in an edge 1r. The link 15 has a bulb-like widened portion around the hole 15a.

These barriers A1 and A2 are shown as being mounted to the rear of the front seats of a two-door sedan. They also may be similarly mounted behind the front seats of a four-door sedan and the like.

Figure 10:
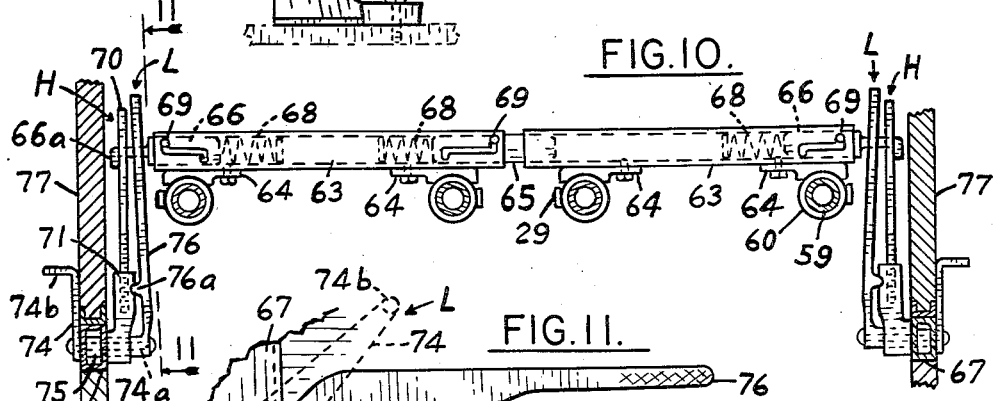
Figure 10 is a fragmentary sectional plan view taken along line 10—10 of Figure 9.

As shown in detail in Figures 6, 7, and 8, the barriers A1 and A2 are attached to the rear of the front seats 37 so they tilt with the front seats 37 to allow access space to and from the rear auto seats to the car doors. Other means (not shown) may be used to move the barriers aside for access space, such as by removal, by sliding, or by pivoting. A resilient bar 38 is fastened to the upper part of the front seat 37 and it is hooked to the lower rod 10c. A spoon-like shaped resilient bar 39 is fastened to the underside of the tiltable back of the seat 37. The bottom side 1r of the panel 1p fits into the socket-like depression in the bar 39. A bearing block or stool 40 has a top contour that fits against the bar 39. A block 40 may be loosely attached to the rear of the lower portion of the front seat 37 so that it will move freely when the seat is tilted and adjusted laterally to suit various drivers. Figure 8 shows how the bar 39 disengages from the block 40 when the seat 37 and barrier are tilted. The minor forward forces that are not absorbed by the spring means in the barriers A1 and A2 are partially transmitted forwardly and downwardly through the bar 39 and the block 40 into the auto body floor framework 41. The bottom of the block 40 may have a surface covering that will cause friction when it is bearing tightly, thus not tending to slide forward under the forward thrust against it. An eccentric pivoted disk type stop 42 may be used. Such a stop may be turned to adjust it against the block 40 after the seat 37 is adjusted. The stop 42 may be separated from the block 40 until a violent force overcomes the friction and pushes the block 40, seat 37, and barrier forward until the stop 42 limits their travel. The upper portions of the barriers A1 and A2 are engaged by the self-coupling arms R. The remainder of the forward forces are transmitted through the arms R into the auto body ceiling framing 43. The arms R restrain the barrier top from moving forward under an impact, while they pivot to allow the barrier to spread upward. An arm R is connected to a bent plate 44. The plate 44 is fastened to the auto body framing 43. The pivot arm 45 is tapped to allow variable engagement to the adjustable extension arm 46. The arm 46 is turned to adjust its effective length to suit the positioning of the seat 37. The hook-like recess in the arm 46 engages a bolt of a spring latch 7c that is secured to the top side 1r of the panel 1p. An arm 46 may have more than one hook, such as is shown for arm 70 in Figure 1. A spring 47 tends to keep the arm R pivoted downward; an adjustable limit screw 48 is set to limit the downward positioning of the arm R. The barrier A1 is disengaged from the arms R by unlatching the spring latches 7c to allow the seat 37 and barrier to be tilted to create access space to and from the rear seat. When the front seat 37 is pivoted back to its normal position, it carries the barrier with it; the bolts on the spring latches 7c, having been previously released, engage the sloping undersides of the arms 46 and raise them slightly as the top of the barrier moves backward until the spring latches 7c engage and enter the slits in the hook-like recesses of the arms 46 and hook securely. A tie T2 may be pushed in pivoting the seat to the normal upright position, so that the bar 38 flexes outward, so that when the latch bolts 7c engage the hooks in arms 46, tension from the bars 38 would tend to pull the top of the barrier forward to hook it securely. If the barriers do not self-couple because of poor adjustment of the arms R when the seats are pivoted back, the latch bolts would chatter noisily against the arms 46, thus annoying the occupants and forcing them to push and spring the barrier so it self-couples to the arms R. When the barriers A1 and A2 are in their latched position, they restrain, with the bars 38, the backs of the front seat 37 from folding during a collision. Folding auto seats may be latched against the sides of the auto as shown in Figure 10, to prevent them from pivoting forward during a collision. The barriers are shown mounted high enough above the auto floor to allow space below them for the feet of the occupants of the rear seat. A gap is left above the barriers to allow the barriers to spread upwardly as they yield and flatten under impacts. The barriers A1 and A2 are positioned so that the middle ordinate of the bow of the panel, that is the deepest part of the bow, is centered where the heavy midsection of a person's body strikes it, causing the greatest impact. The occupant's body bearing against a barrier tends to confine the bowed panel to an arched shape, thus barriers without ribs may be used to give a limited amount of protection. The torso being centered would travel the farthest in decelerating to absorb and thus reduce the greatest portion of the body force gradually, and in doing so it would tend to keep the body contact pressure from becoming so great as to cause breakage of the occupant's body.

The barriers, such as barrier A1, are most effective to prevent injury when they yield considerably to lengthen the deceleration period so as to more gradually absorb the force and thus keep the intensity of the body bearing pressure per square inch low where it bears against the barrier. The arched panel becomes more resistant to the thrust against it as the force becomes weaker from being absorbed by the barrier. Thus the panel spends its strong shape to absorb and weaken the violent force, then the barrier resists and absorbs the remainder of the force without much yielding. The head, legs, and feet of people weigh much less than their torso, thus their momentum forces can be restrained with less yielding of the shell 1p where they bear.

The shell 1p may be one piece or it may be two or more pieces that are engaged. The shell 1p would be most useful if at least the upper portion has a transparent area to allow all of the occupants of the auto to see through it. The portion of the panel that may be opaque may be readily made stronger than the yieldable transparent portions. The non-transparent portions may be of reinforced plastic or metal. Plastic may have fiber glass impregnated in it for effective reinforcing. The portion of the panel 1p that may be opaque may be covered with padding 49. The padding 49 may be an inflated rubber protector similar to that of a baseball umpire's chest protector. Non-inflated padding may be made of fiber glass, foam rubber, or other types of resilient cushionable material. The padding 49 would distribute the impact force more evenly over a greater area of the occupant's body. The padding would yield to cushion the force and in doing so it would be irregularly depressed to tend to mold it to the shape of the body surface that is bearing against it. The inflated padding of rubber and nylon would provide a higher degree of protection than fibrous padding, since it would provide a firmer cushion which would more firmly mold to the body features and thus better distribute the body impact force over a greater area, to thus keep the bearing pressure per square inch as low as possible. When the padding 49 is compressed by the body pressure against it, it would tend to create enough friction to reduce the tendency of the body to slide off it. Edge padding or curbing 50 may be fastened along the top of the barrier to cushion and restrain people from sliding upwards. This type of curbing may also be used along the vertical edges of the barriers to restrain people from sliding to the side. The curbing 50 may be inflated tubing or resilient fibrous padding.

The arms R and their supports may be padded (not shown). If a ceiling barrier A8 is used, it would extend forward enough to shield the occupants from the two center arms R. The bent plates 44 being bendable with accordion action yield upwardly from an impact from below. The arms R at the sides of the car would be off the line of flight of an occupant. These arms should have padding or shielding means for furnishing more protection.

The human head has little weight compared to the torso, and the panel 1p in yielding less in its upper portion can resist the lesser momentum forces of the head. Although the panel 1p could cushion and absorb the momentum of the head, the head is so delicate that it may be injured even if no bones are broken. Intense impact forces against the head can cause brain injuries. A slightly yieldable transparent curved plastic shell or blister 51 may be fastened to the shell 1p, to provide more cushioning for the head. The shell 51 may have slightly yieldable closed ends to make an air-filled cushion-blister that would be more effective in reducing injury. The blister may be filled with dry compressed air or a dry gas to eliminate moisture. The transparent shell 51 would act as a cushion to prevent head injuries by dishing to an extent to the contour of the surface of the head portion that strikes it. Thus it would increase the bearing surface area of the head to the shell 51 which would distribute the force over the greater surface and thus keep the pressure per square inch low. The blister would cushion and tend to prevent severe injury to the projecting features of the head including the jaw, the nose, and ears. When a shell 51 dishes in, it flattens to an extent and bridges across the eye pockets, thus tending to lessen the chances of injuries to the eyes. Since eye glasses set back slightly, impacts against the shell 51 minimize the risk of the glasses being shattered and injuring the eyes. Since the panel 1p would have a tendency to buckle under the impact of a person's body against it, beams or ribs 52 may be fastened between the ribs C to reduce the buckling tendency. The beams 52 would allow the use of a thinner, more yieldable shell 1p. The ribs C at the adjacent edges of the barriers A1 and A2 may be doweled or latched together to make them act together to distribute the impacts. The barriers A1 and A2 act together as a diaphragm at the center of an automobile to resist the buckling effects of a side thrust from a broadside collision that tends to buckle an auto. Since the transparent plastic panel 1p and the shell 51 are likely to become scratched when cleaned, they may be polished to remove the scratches. Such polishing of plastics requires considerable effort. A refractisil may be used to fill up the scratches to restore the optical efficiency of the plastic. A silicone solution may be used as a refractisil. It is spread onto the plastic flushing out the dirt from the scratches. Such a refractisil is used to fill in scratches in photographic negatives to eliminate undesirable refraction. Plastics that have become clouded can be polished to restore their optical efficiency. The forward interior portion of the auto shown in Figure 1 has barriers A3 and A4. These barriers are similar to the barriers A1 and A2. The barriers A3 and A4 remain in fixed positions except when major cleaning operations or repair operations require their removal. These barriers are hooked onto bearing plates 53. The plates 53 are fastened to the auto body framework. The latch bolts 7c or similarly projected bolts on the barriers engage the hook-like slots in the plates 53. The slots allow the barriers to spread upwardly when impacted. The lower portions of the barriers have a hinged engagement to the pin plates 54. The plates 54 are fastened to the auto body framework. The hinge pins may be readily removable to allow quick removal of the barriers. The barriers A3 and A4 may have curved doors 55 to allow access for cleaning the windshield and access to the glove compartment, radio, heater controls, and the like. The top and bottom edges of the doors 55 bear against the door opening edges in the panel so that doors would maintain continuity to carry the arched thrusts. The doors may be transparent. They may be covered with padding. The use of the two barriers A3 and A4 allows the ribs and splices to be at the center of the auto where they are not highly objectionable. A single barrier as large as barriers A3 and A4 combined may be used if preferred. The steering wheel column projects through a slot in the panel of the barrier A3. The steering wheel may have a round steel bearing plate 56 fastened to it. The plate 56 may be fastened to the spokes of the wheel 56. There would be space between the plate 56 and the wheel rim to allow the driver to grip the wheel. The top of the plate 56 may be covered with cushioning material such as padding 49. When the driver is thrown forward during a collision, a large area of his chest would be pressed against the padding on the plate 56. The pressure on the plate 56 caused by the momentum of the driver's body would cause the steering wheel to bend and a collapsible type steering column to yield downward. Thus the steering wheel would be depressed and bent until the wheel imbeds into the padding on the barrier A3. The interior side barriers A5 and A6 are positioned to protect the auto occupants when an auto skids broadside and collides sideways or rolls over. The barriers A5 are engaged to the auto doors. The rear barrier A6 would be similar to the barrier A5 except that on a two-door sedan they may be attached to the auto body framework. The barriers A5 and A6 are supported by the plates 57. The plates 57 being fastened to the body or door framework. The plates 57 may be slotted to allow the barriers to spread upwardly when flattened by an impact. Bearing bars 58 may be fastened to the barrier or the auto body to allow suitable bearing surfaces for the barriers to bear and slide against. The barriers A5 and A6 may spread downwardly from an impact with their fixed end being fastened close to the ceiling. The barriers A5 and A6 may be hooked to the glass in the windows similar to the arrangements shown for the barriers A9 and A10.

The barriers A7 and A8 would cushion and restrain persons who are hurled against the ceiling during rollovers, collisions and when bumps in the roadway cause the occupants to hit the ceiling. These ceiling barriers may be supported by hangers from their ties to the ceiling framing so their edges bear against the ceiling framework near the sides of the car. These barriers may spread in both directions when impacted. The barriers A7 and A8 would generally be subject to minor impacts as compared to those of the barrier A1, thus they would be useful to a large extent without a catch or snubber. They would furnish more protection with a catch or snubber, as autos sometimes skid broadside into a drainage ditch and then roll-over with the top crashing into the embankment rising from the ditch.

The barriers A9, A10, and A11 may be hooked onto the exteriors of autos to cushion violent forces against the auto. Such barrier may be more rigidly fastened to an auto (not shown). The barriers A9, A10, and A11 would generally be most effective without catches or snubbers. They may have catches or snubbers if bouncing action against them is not wanted. Future autos may have these types of barriers built into the auto body.

Figure 9:
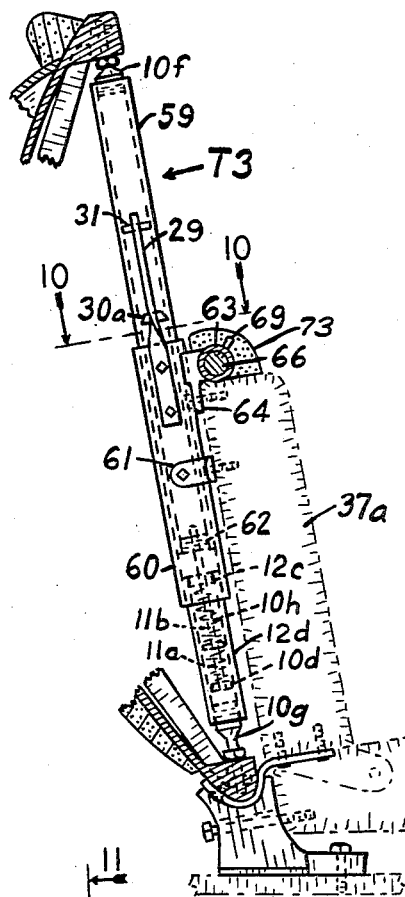
Figure 9 is a view similar to Figure 6, showing a barrier mounted to a seat without attaching it to the ceiling of an automobile.
Figure 11:
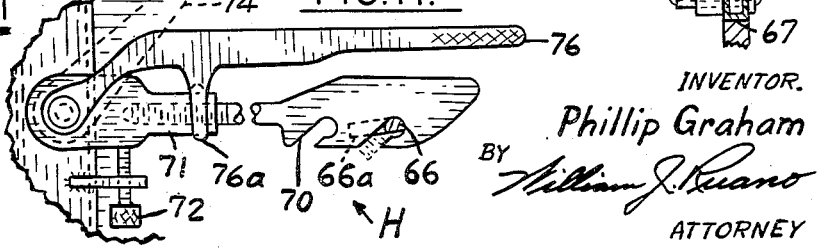
Figure 11 is an enlarged sectional view taken along line 11—11 of Figure 10.

Figures 9, 10, and 11 show an arrangement for mounting barriers behind the front seats of a convertible auto or an auto with a weak top. Barriers may be similarly mounted to seats in buses, trains, planes, and the like.

The arrangement shown in Figure 9 is similar to that shown in Figure 6, the difference being in the means to transmit the forward force from the top of the barrier into the auto body framework. There is no connecting means from the top of the barrier to a ceiling framework. The seat 37a is tiltable as was previously described for the seat 27. The tie T3 is similar to tie T2 except that it is a stiff member that acts as a telescoping cantilevered beam in taking the forward thrust from the top of the barrier to the seats where it can be transmitted into the car body. The tie T3 has telescoping tubes to allow the tie to yield upwardly as the barrier panel is partially flattened and spread under an impact. The arrangement at the bottom of the barrier is the same as that shown in Figure 6 for the barrier A1, except that fastening means such as bolts may be used to hold the bottom of the barrier more securely to the bar 39 to prevent the cantilever from kicking back and bending or breaking the bar 39.

The short connecting rods 10f and 10g engage the sides 1r and connect them to strong tubes 12d and 59. The rods may be welded or threaded to the tubes. A strong tube 60 fits over the tubes 12d and 59. The tube 60 is fastened, such as by welding, to the tube 12d and its has telescopic sliding fit with the tube 59. The tube 60 is attached to the seat 37a with a clip 61. A disk 62 is fastened near to the bottom of the tube 60. A tie rod 10h is fastened to the disk 62 and to the disk 10d. Springs 11a and 11b are encased in the tube 12d to act similar to the action described with Figure 4. The tube 59 is used as a stiff tie between the rods 10f and 10h. A catch bar 29 is attached to the tube 60. A tapered offset 30a acts like ring 30 to engage and hold the catch bar 29. When the barrier spreads under an impact, the tie yields with the tube 59 sliding partially out of the tube 60.

A snubber S may be used rather than the arrangement with the catch. The snubber S would be positioned in the tie in place of the tube 12d. The seat 37a is locked to the sides of the auto to provide a means to transmit the forward force from the upper portion of the barrier into the auto body framework. There are two strong horizontal tubes 63 fastened with clips 64 to the tops of the backs of the seats 37a. A center latch bolt 65 is used to couple or uncouple the tubes 63 to allow a single seat 37a to be tilted. The two end latch bolts 66 may be latched to the self-coupling arms H. The latched tubes act as a beam. The arms H can transmit the force into the auto body door post 67. Springs 68 may be used to maintain pressure against the latches 65 and 66 to prevent them from creeping and uncoupling. The latches 65 and 66 each have a handle 69 that projects through slots in the tubes 63. The slots have notches or offsets in their end to lock the latch bolts into locked or unlocked positions. The latch handles 69 on the latches 66 are pivoted in moving them into the slot notches to lock them. The pivoting of the latch bolts 66 causes their narrow offset ends 66a to pivot up from the keyhole-like slots in the extension arm 70 of the coupling H. Thus the coupling H cannot laterally pull away from the latch. The coupling arms H are similar to arms R previously described. Pivot arm 71 is similar to arm 45. Since the arms H would tend to pivot upwardly from road shocks and collision shocks, the center end portions of the latches are slightly flattened so they may enter the narrow portions of the slots in the arm 70 when the latch bolts are projecting. When the latch handles 69 are pivoted to lock the latches, the narrow center end portion is pivoted in the rounded inner portion of the slots, locking or keying the bolts to the slots. Thus the arms H are securely engaged. The latches 66 may be coupled or uncoupled to the arms H either by sliding the latch bolts or by keeping the latch bolts projected but not pivoted to a locked position, so that by springing the seats back slightly the play would allow coupling and uncoupling actions. The lower outer sloping end portion of the arm 70 would engage the latch bolt when coupling, the arm 70 pivoting up until the latch bolt engages the slot or catch-hook. The end of the coupling H is pushed up manually to uncouple the barrier. The arms H can obviously be used when coupled without the locking by pivoting the handles 69. There is a limit machine screw 72 to limit the downward pivoting movement of the coupling H. The arm 70 has a threaded engagement to the arm 71 to allow adjustment to suit various positioning of the seat 37a. The arm 70 may have more than one slot, two are shown, to provide for different positioning of the seats. When the couplings H are not coupled to the latch bolts, they would chatter noisily from road shocks, thus annoying the occupants until they coupled the barriers, thus forcing safety measures. The padding 73 would be used to cover the tubes 63.

Adjustable vehicle seats that lock into various tilted positions such as those used on buses, would not need to be latched to the side of a conveyance body.

About a fourth of the occupants of autos who are killed in car accidents are those who fall out when a door is accidentally unlatched or who are hurled out of the cars through the door openings by the violent collision forces. Common car door latches have only a slight gripping projection. When the car body is sprung by collision forces or from hitting a hole in a roadway, the doors usually swing open. The barriers A5 depend on the doors remaining latched. An auxiliary door latching means L can be used to restrain the door from opening when the auto body is sprung and the primary latch fails. The latches L may be coupled with the barrier couplings H to allow both functions to be performed with a single movement, thus making it easy for the occupants to maintain the safety set-ups. As shown in Figures 10 and 11, a door latch L is positioned above a coupling H. The pivotable latch 74 has a shaft 74a. The shaft 74a projects through the tubular pin 75 that engages the coupling H. The shaft 74a is keyed to the inner door latch handle 76. The handle 76 has an offset 76a that has a slight notch to grip it to the arm 71. When either the handle 76 or the coupling H is gripped and pivoted upwardly, the single movement uncouples the arm H and unlocks the latch 74. The reverse action locks the door latch 74 and sets the coupling H so it couples readily. When there is only need to open the door 77, the handle 76 may be sprung inwardly slightly to disengage the offset 76a from the coupling H, thus allowing the handle 76 to be pivoted to open and lock the door latch 74. There is a thin portion of the handle 76 that allows the handle to spring aside. An offset 74b acts as an exterior latch handle. This offset 74b should be weak enough to readily bend or shear off if it should come in contact with a colliding auto member and the like. The latch L may be equipped with a delayed action closer (not shown) that would be similar to common delayed action door closers.

Figure 12:
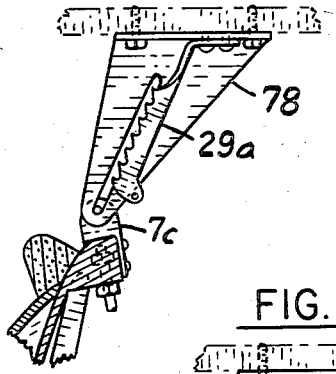
Figure 12 is a fragmentary elevational view showing a detail of a modified bearing plate and a catch for a barrier.

Figure 12 shows a modification that has a slotted bearing plate 78 that is similar to plate 53. The bolt of the latch 7c engages the slot in the plate 53. A resilient catch bar 29a is similar to catch 29. The bolt of the latch 7c engages and hooks into the catch 29a at the limit of the barrier spreading action. The bolt of latch 7c may be partially retracted to allow it to disengage the catch 29a, to allow the barrier to rebound. The slot in the plate 78 is sloped to allow the upper portion of the barrier to move forward slightly to lengthen the deceleration period.

Figure 13:
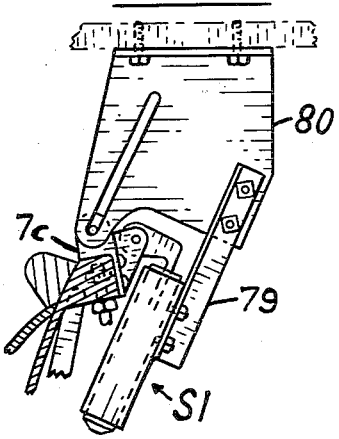
Figure 13 is a fragmentary elevational view showing a detail of a modified bearing plate and a snubber for a barrier.

Figure 13 shows a modification that is similar to that shown in Figure 12. A snubber S1 is used with this modification rather than the catch. The snubber S1 is similar to the snubber S. The snubber piston rod is pivotably connected to an offset on the latch 7c and the snubber S1 is supported by an angle iron 79 to the bearing plate 80.

Figure 14:
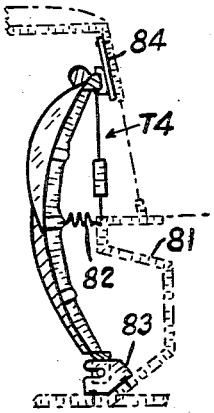

Figures 14 to 19 inclusive show some various modifications of the curved barrier. Figure 14 illustrates how a barrier may be mounted in an auto. The tie T4 of the barrier being attached to the auto body framing 81 at the dashboard and to the top of the barrier. The auto body 81 acts as part of the tie. Springs 82 are fastened to the center of the barrier and to the framing 81 to hold the barrier against the bearing plates 83 and 84. The bearing plate 84 may be a continuous plate above the windshield or narrow bearing plates may be attached to the front window posts including a center post. The panel may be made to yield until it bears against the ceiling, then the auto body resists or absorbs the remainder of the force.

Figure 15:
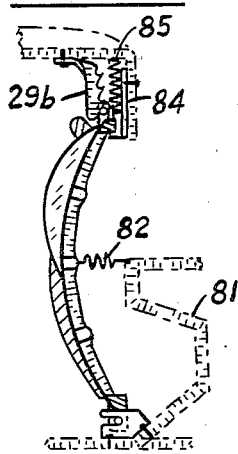

Figure 15 shows a modification whose lower portion arrangement is similar to that shown in Figure 14. The upper portion of this modification has the barrier bearing against a bearing plate 84. A spring 85 can yield, absorb, and resist the collision forces that are diverted to the edges of the bowed panel, rather than have a resilient tie such as T2 or T4 absorb such forces. Catches 29b which are similar to catch 29a engage the latches and prevent objectionable rebounding action after a collision. The conveyance body framework resists the forces from the barrier that tend to spread the auto body.

Figure 16:
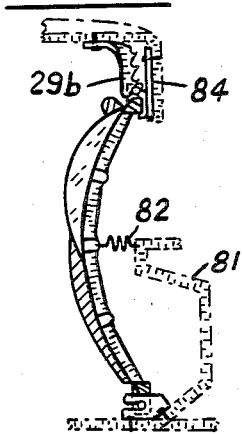

Figure 16 shows a modification that is similar to the arrangements shown in Figures 14 and 15. The area of the barrier that bears against the plate 84 may be covered with resilient rubber or the like to cause friction against the plate 84 when the barrier spreads, the friction absorbing some of the violent thrust. The curve panel is made of a resilient plastic that is molded to the curved shape. The friction against the plate 84 and the spring action of the resilient panel absorb the force. The spring 82 keeps the top edge of the panel bearing firmly against the bearing plate 84, also the pressure of an occupant's body against the panel during a collision tends to press the top edge against the plate 84, thus creating considerable pressure to cause much force to be absorbed by the friction against the plate 84. The panel may spread until the ceiling limits this action. Barriers of this type may rely solely on the friction or the resiliency to absorb the force.

Figure 17:
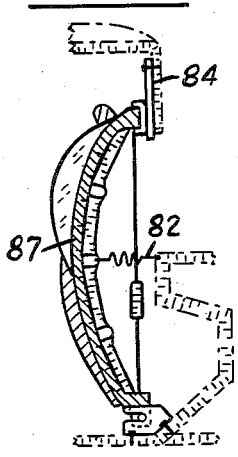

Figure 17 shows a modification that has a curved panel 87 that is non-resilient. The concave side of the panel 87 is deeply scored with horizontal cuts. Such a panel could take the high compression forces since it would act like a stone arch before it collapses. The convex surface of the panel 87 may have a thin flexible covering adhered to it. The flexible covering would tend to hold the panel 87 together as it flattens when it cracks where it is scored. The scoring of the panel tends to control the cracking action. This type of panel could be made of brittle plastics or glass. Reinforcing metal fabric near the convex surface would tend to hold a brittle panel together as long as it is confined to maintain an arched shape.

Figure 18:
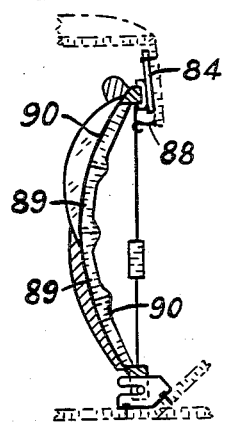

Figure 18 shows a modification that is similar to that shown in Figure 14. A resilient hook 88 is fastened to the auto body framework and it is hooked to the tie rod to hold the top of the barrier against the bearing plate 84. The rib portions 89 and 90 may have tongue and groove end contact edges with each other, but without pin connections. The tongue and groove joints would hold the rib portions together in alignment. The rib portions would act similar to stones in a stone arch.

Figure 19:
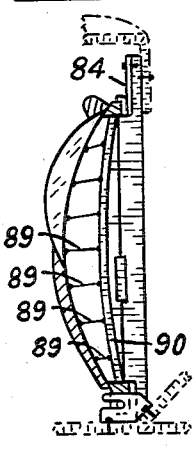

Figure 19 shows a modification that has limit wires 89 and limit curbs 90. The curb 90 is offset so the vertical edge of the curved panel contacts it, thus stopping the flattening of the panel. The series of limit wires 89 prevent the panel from bulging outwardly. The wires 89 can readily bend in to allow the panel to flatten until it contacts the curb 90.

Figure 20 shows a modification that is similar to the arrangements shown in Figure 1 for the barriers in front of the seats. The barriers A12 and A13 act as transparent cushions. The spaces below these barriers can be thickly padded with low cost opaque cushioning padding. These barriers are small, requiring little space. They can easily be attached or be removed. They furnish protection where protection means is most needed.

The various means described for making useful curved barriers may obviously be used in other than the various combinations shown. Barriers for the interiors of conveyances would in general be most useful when they are equipped with a catch or a snubber.

Thus it will be seen that I have provided an efficient and strong curved safety barrier which may be transparent, which provides optimum strength for a given weight, and which, by curvature of panel and yieldable means makes it possible to cushion and absorb violent forces.

While I have illustrated and described several specific embodiments of my invention, it will be understood that these are by way of illustration only, and that various changes and modifications may be made within the contemplation of my invention and within the scope of the following claims.

I claim:

1. In a conveyance for human beings having an occupant compartment, a yieldable barrier disposed inside and on a forward portion of said compartment to cushion an occupant when thrown against it as a consequence of sudden deceleration, said barrier comprising a thin, flexible, bowed panel with its convex surface confronting the occupant, said conveyance having bearing surfaces engaging the end portions of the bow of said panel, at least one of said end portions being relatively movable to permit maintenance of a bowed shape of said panel under impact, said panel being of sufficiently rigid material to maintain substantially constant thickness during impact, spring means engaged with at least one end of said panel for absorbing the energy of said impact and for yieldably restraining said panel while the panel is expanding in width as a consequence of said impact and tending to retain a bowed shape in said panel, and means for restraining rebound of said panel.

2. A device as recited in claim 1 wherein said bearing surfaces are disposed adjacent the upper and lower portions of said conveyance and are engageable with the top and bottom extremities of said panel.

3. A device as recited in claim 1 wherein the chord of said bowed portion of the panel extends substantially vertically and wherein an upper portion of said panel is of transparent plastic material to permit viewing therethrough by the occupant.

4. A device as recited in claim 1 together with means extending across a concave portion of said panel for preventing buckling of said panel.

5. A device as recited in claim 1 wherein at least the upper portion of said panel is transparent to permit viewing therethrough by the occupant.

6. In a conveyance having an occupant compartment and including a barrier which is positioned in said compartment, comprising a thin panel bowed so that its convex surface will confront the occupant, at least an upper portion of said panel being transparent to permit viewing therethrough by the occupant, and means engaged with at least one end of said panel for absorbing the energy of impact of the occupant when thrown against said panel as a consequence of sudden deceleration of said conveyance and for yieldably restraining decrease in curvature and for maintaining the bowed shape of said panel, and restraining means for preventing sudden rebound of said panel.

7. In a conveyance including a seat, a thin transparent, resilient panel of normally bowed shape when not under tension and positioned so as to present a convex surface in confronting relationship to the seat and having its lower extremity adjacent to and engageable with a fixed portion of the conveyance intermediate the floor and roof, and having its upper extremity secured at substantially the ceiling level of said conveyance, bearing means on said conveyance adjacent said extremities, at least one of said extremities being movably mounted relative to its bearing means and outwardly from the other extremity to permit maintenance of a bow in said panel under impact, and means for restraining said panel against sudden rebound.

8. A yieldable barrier comprising a thin resilient panel bowed inwardly in front of a space to cushion and absorb a violent force against the convex side of the panel to shield objects or occupants of the said space, bearing surfaces engageable with the end portions of said bowed panel, at least one of said bearing surfaces being a frictional surface extending outwardly of one of said end portions so as to allow spreading apart of said end portions and partial flattening of said panel upon application of said force, whereby the friction developed by said frictional surface will absorb said force.

9. A yieldable barrier comprising a thin panel bowed inwardly in front of a space to cushion and absorb a violent force against the convex side of the panel to shield objects or occupants of the said space, bearing surfaces engageable with the end portions of said bowed panel, means to maintain a bowed shape of said panel as it yields and partially flattens upon application of said force, spring means for allowing said end portions of the panel to yieldingly spread apart to a limited degree to resist said force, said spring means engaging at least one end portion of the panel, and a one-way acting restraining means engageable with said last mentioned end portion for preventing sudden rebound of said panel after application of said force but for allowing outward separation of said end portions.

10. A yieldable barrier as recited in claim 5, wherein one of said panel end portions includes a hinge for pivotally moving the panel to allow access through the space normally occupied by said panel.

11. A device as recited in claim 5, wherein said means for restraining rebound of said panel includes a pawl and ratchet for permitting only outward movement of said movable end of said panel and prevents rebound until released.

12. A device as recited in claim 5, wherein said means for restraining rebound of said panel includes fluid means having a bleeder valve for retarding fluid flow through said fluid means during rebound movements of said panel.

References Cited in the file of this patent

UNITED STATES PATENTS

| | | |
|---|---|---|
| 2,070,760 | Straith | Feb. 16, 1937 |
| 2,626,163 | Scantlebury | Jan. 20, 1953 |
| 2,695,792 | Rumsey | Nov. 30, 1954 |
| 2,715,042 | Lancaster | Aug. 9, 1955 |
| 2,740,642 | Atwood | Apr. 3, 1956 |
| 2,757,040 | McLelland | July 31, 1956 |

FOREIGN PATENTS

| | | |
|---|---|---|
| 868,261 | Germany | Feb. 23, 1953 |